US008881047B2

(12) United States Patent
Stewart

(10) Patent No.: US 8,881,047 B2
(45) Date of Patent: Nov. 4, 2014

(54) SYSTEMS AND METHODS FOR DYNAMIC BACKGROUND USER INTERFACE(S)

(75) Inventor: William S. Stewart, Victoria (CA)

(73) Assignee: Moment USA, Inc., San Francisco, CA (US)

(*) Notice: Subject to any disclaimer, the term of this patent is extended or adjusted under 35 U.S.C. 154(b) by 353 days.

(21) Appl. No.: 13/379,306

(22) PCT Filed: Jun. 18, 2010

(86) PCT No.: PCT/US2010/039177
§ 371 (c)(1),
(2), (4) Date: Dec. 19, 2011

(87) PCT Pub. No.: WO2010/148306
PCT Pub. Date: Dec. 23, 2010

(65) Prior Publication Data
US 2012/0102428 A1    Apr. 26, 2012

Related U.S. Application Data

(60) Provisional application No. 61/269,065, filed on Jun. 19, 2009, provisional application No. 61/269,064, filed on Jun. 19, 2009, provisional application No. 61/269,066, filed on Jun. 19, 2009, provisional application No. 61/269,067, filed on Jun. 19, 2009.

(51) Int. Cl.
*G06F 3/048*    (2013.01)
*G06F 3/0481*    (2013.01)
*G06F 9/44*    (2006.01)

(52) U.S. Cl.
CPC ............ *G06F 3/0481* (2013.01); *G06F 9/4443* (2013.01)
USPC ......................................................... 715/781

(58) Field of Classification Search
CPC ............................. G06F 3/0481; G06F 9/4443
USPC ................................................... 715/781, 764
See application file for complete search history.

(56) References Cited

U.S. PATENT DOCUMENTS 5,905,492 A    5/1999    Straub et al.
5,936,608 A    8/1999    Springer
(Continued)

FOREIGN PATENT DOCUMENTS

CN    101401402    4/2009

OTHER PUBLICATIONS

"European Search Report dated Jun. 3, 2013," European Application No. 10 790 266.0, 6 pages.

(Continued)

*Primary Examiner* — Omar Abdul-Ali
(74) *Attorney, Agent, or Firm* — Novak Druce Connolly Bove + Quigg LLP

(57) ABSTRACT

Some aspects relate to providing a graphical interface for an application, underlying a graphical interface provided by an operating system shell. In an example, an input device (e.g., a mouse) generates an event associated with a location of a graphical display. The event is intercepted by a code segment provided in conjunction with the application, which determines whether the location is associated with a defined portion of the display associated with an actionable area of the graphical interface for the application, and that the location is not also associated with an element of the OS shell graphical interface (and if applicable, an active window of another application). If those conditions hold, then the event is redirected to the application, which can become active or take one or more actions. In a particular example, the defined portion of the display is visually distinguishable on a wallpaper image stored in video memory.

21 Claims, 12 Drawing Sheets

(56) References Cited

U.S. PATENT DOCUMENTS

| | | |
|---|---|---|
| 5,978,857 A | 11/1999 | Graham |
| 6,025,841 A | 2/2000 | Finkelstein et al. |
| 6,091,414 A | 7/2000 | Kraft, IV et al. |
| 6,246,407 B1 | 6/2001 | Wilks et al. |
| 6,300,936 B1 | 10/2001 | Braun et al. |

OTHER PUBLICATIONS

"Office Action dated Dec. 30, 2013," Chinese Application No. 201080036131.5, 18 pages.

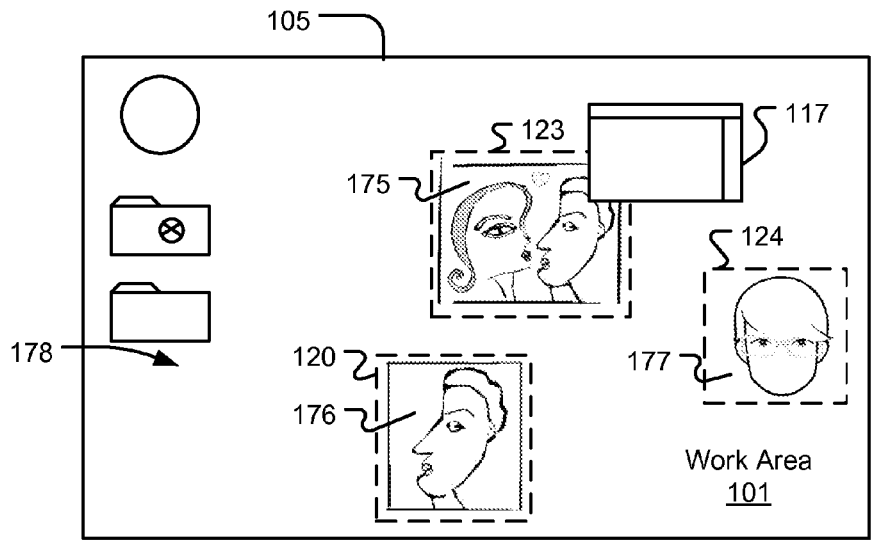
FIG. 14
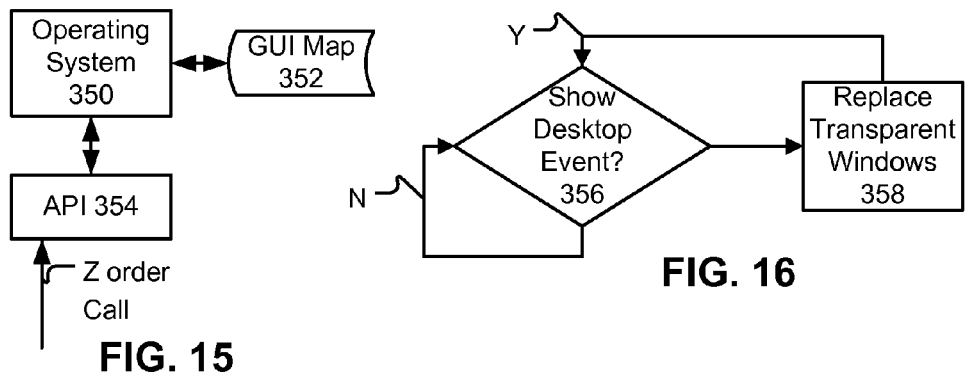
FIG. 15
FIG. 16
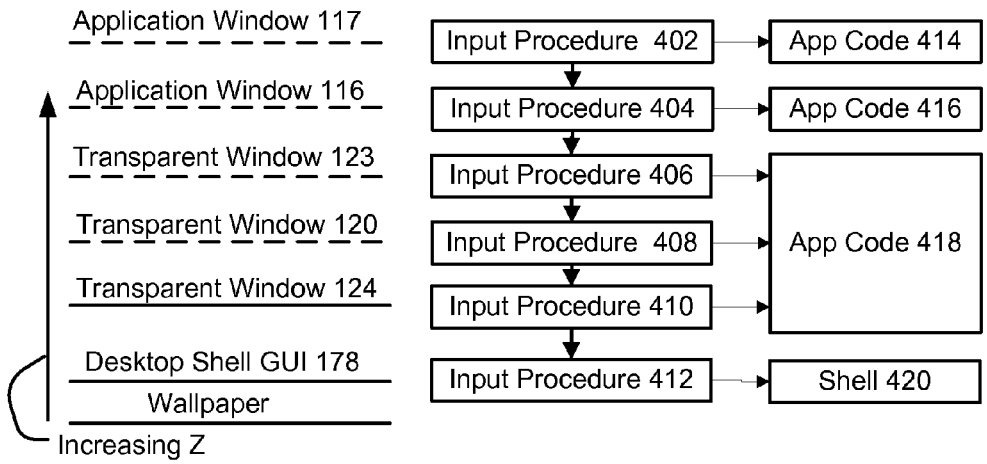
FIG. 17

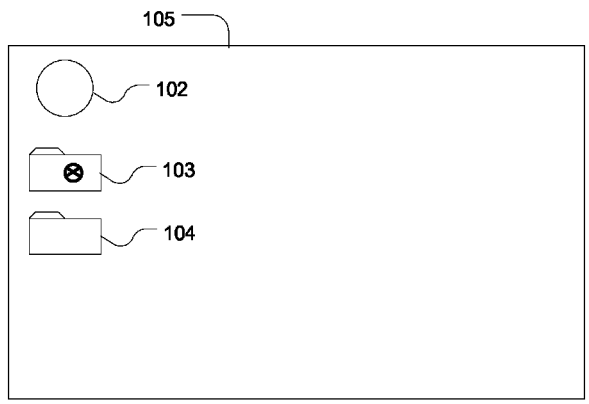
FIG. 18
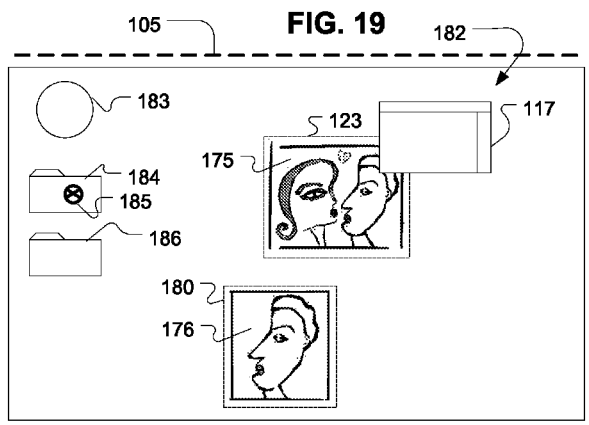
FIG. 19
Application Window 117
Transparent Window 2
Window 1 + Opaque Desktop Shell Replica 180
Desktop Shell GUI 105
Wallpaper 107
FIG. 20

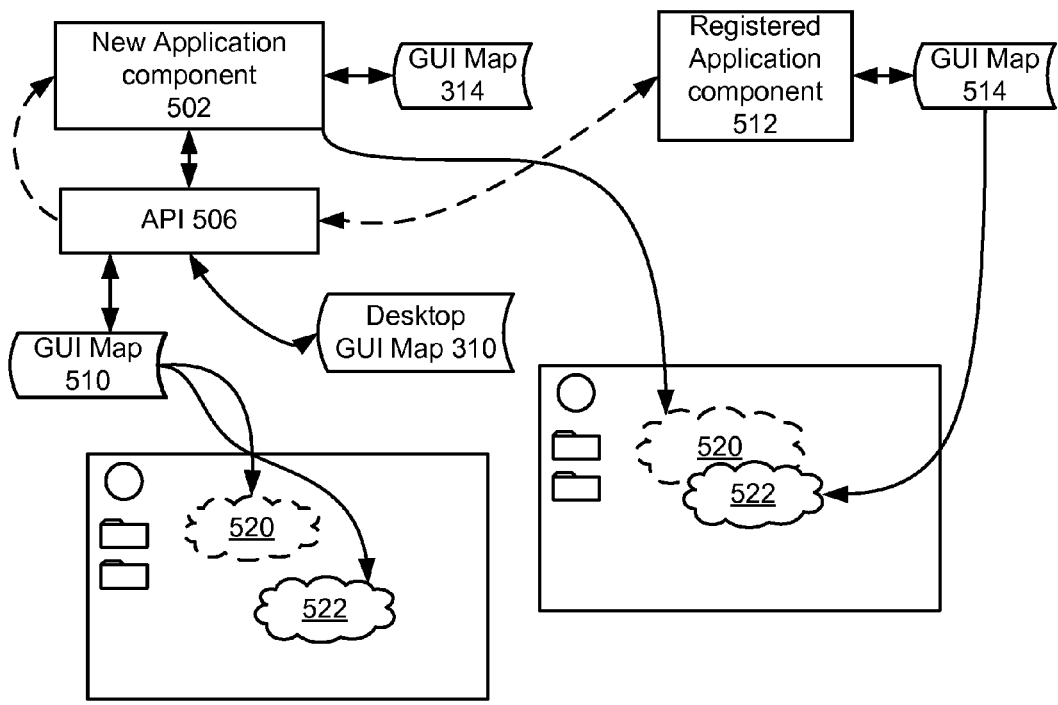
FIG. 23
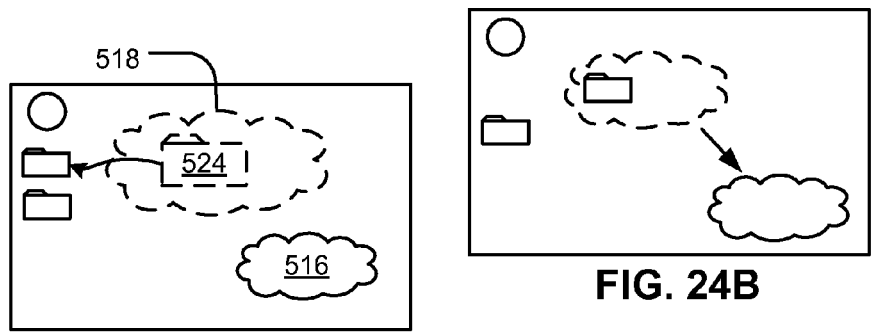
FIG. 24A
FIG. 24B

SYSTEMS AND METHODS FOR DYNAMIC BACKGROUND USER INTERFACE(S)

CROSS REFERENCE TO RELATED APPLICATIONS

This application claims priority from U.S. Provisional Patent Application No. 61/269,065, filed Jun. 19, 2009, and entitled "Dynamic Desktop Application User Interface", from U.S. Provisional Patent Application No. 61/269,064, filed Jun. 19, 2009, and entitled "Intelligent Tags", from U.S. Provisional Patent Application No. 61/269,066, filed Jun. 19, 2009, and entitled "Wallpaper Social Media Sharing", and from U.S. Provisional Patent Application No. 61/269,067, filed Jun. 19, 2009, and entitled "User Interface for Visual Social Network" all of which are hereby incorporated by reference for all purposes herein.

BACKGROUND

1. Field

Aspects relate to user interfaces, and some more particular aspects relate to provision of advanced graphical interfaces.

2. Related Art

Graphical User Interfaces (GUIs) are a common way for users to interface with electronic devices, which frequently have computational capabilities. Generally GUI includes a graphical display of icons representatives of resources available for interaction to a user. Examples of such resources include folder icons representing storage locations in memory, particular files, locations on networks, such as shortcuts, as well as shortcuts to applications. Status information also is frequently presented in a GUI, such as information located in a taskbar relating to currently running programs, and has quick access menus. Applications that execute on such devices typically execute in Windows associated with those devices; these windows can be maximized and minimized. Typically, a GUI is maintained by a shell process closely associated with an operating system executing on the device.

Typically, GUIs employ a desktop metaphor, such that each icon displayed in a GUI is associated with coordinates that locate that icon in a GUI with respect to other icons and to a boundary of the GUI. Often to enhance the aesthetic characteristics of the GUI, a wallpaper image can be disposed in a background of the GUI so that icons of the GUI are overlaid on the background obscure the background. The background image can be selected by a user, and is often stored in reserved video memory because a large portion of it is frequently displayed and so it is beneficial to ensure that it is stored in fast memory.

Input devices allow a user to interact with the GUI such as by moving pointer to hover over a particular location in the GUI associated with a particular icon. Then a user can take another action to indicate that the resource represented by that icon is to be accessed, such an action can include a double-click, for example.

Further improvements and enhancements to the typical graphical user interface model are proposed herein.

BRIEF DESCRIPTION OF THE DRAWINGS

The disclosure that follows refers to the following Figures, in which:

FIGS. 10-13 depict examples of memory allocation, process communication, and other aspects of implementations in accordance with these disclosures;

FIG. 14 depicts an interface wherein a number of distinct transparent windows are co-arranged with distinguishing portions of a workspace, to receive user inputs in those areas and provide application functionality or activation;

FIG. 15 depicts an approach to maintaining an appropriate z ordering of windows maintained by the OS, such that the transparent windows of FIG. 14 remain in an appropriate order;

FIG. 16 depicts a method where a response to a show desktop event includes replacing windows, such as those of FIG. 14, in their appropriate z ordering, so that they can continue to receive input in their allocated positions;

FIG. 17 depicts a flow of communication among a number of input procedures (such as message hooks or windows procedures for processing inputs), according to z ordering, and passage of messages to appropriate application recipients;

FIG. 18 depicts a desktop display, maintained by an operating system, for example;

FIG. 19 depicts a display to replicate the elements of the desktop display, and additionally display other elements that can detect inputs;

FIG. 20 depicts that the replicated desktop display is associated with code that filters or otherwise parses inputs so that inputs apparently directed to desktop display elements are passed to an OS handler procedure (for example), while inputs directed to the additional elements are directed to an application or other consumer;

FIG. 23 depicts aspects of an API that can accept requests for allocation of workarea portions, and can include arbitration functionality to decide what screen portions are allocated to what applications, and so on;

FIGS. 24A and 24B depict aspects of how application code associated with the API can relocate icons and other elements, in some implementations;

SUMMARY

Figure 1:
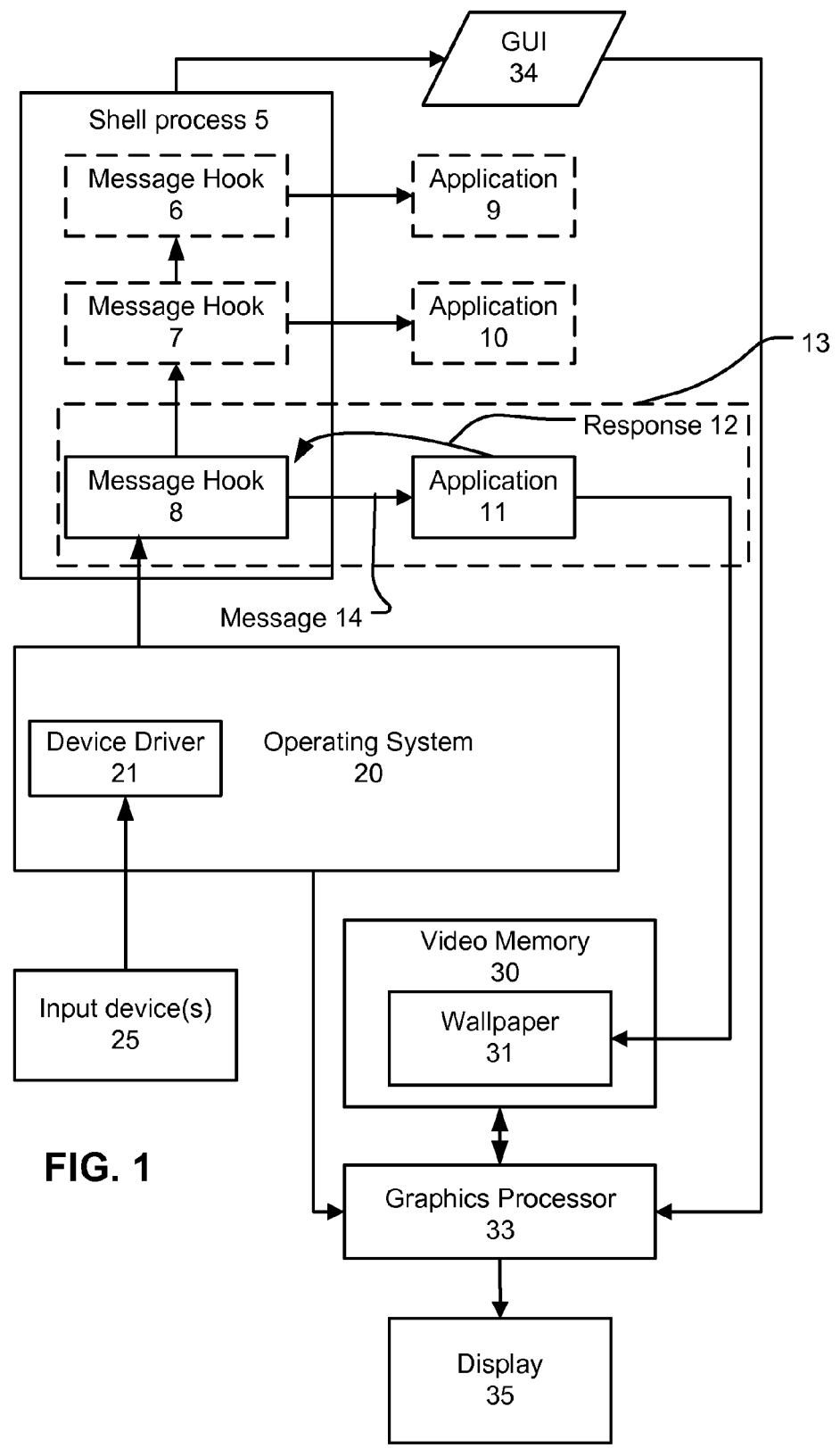
FIG. 1 depicts a block diagram showing communication and interoperation with elements described herein.

In some aspects, code is injected into a program space of an operating system for a device, where the injected code can monitor user interface events such as keystrokes and mouse events before these user interface events can be handled by the operating system. The code has access to a user interface model, either in local program space, or accessible through a messaging subsystem. The user interface model includes information such as a map of areas of the screen where mouse events, including movements or clicks, can activate features or routines. The model can model situations where other user interface events such as keystrokes have a meaning. By consulting the user interface model, the injected code can determine which user interface events to redirect or pass on. Redirected events are used by an application receiving them, and do not cause default operating behavior as they otherwise would. For events not matching the user interface model, these events can be passed or otherwise allowed to propagate to the operating system or event handler that would have received them in the absence of the injected code. The user interface model can correspond to regions of a wallpaper background image that are distinguished from surrounding areas, such as by inclusion of different pictures, images, or other content.

In some implementations, the injected code operates principally in a shell process that also maintains a desktop GUI interface comprising elements such as icons for folders, and otherwise provides a look and feel for the underlying operating system, including the kernel and file system. Some implementations can use message hooks that receive messages from a messaging subsystem. Other examples include virtualized device drivers and stub DLLs, which can intercept user input events from sources thereof.

Still further implementations can use a transparent window or series of transparent windows maintained by one or more application processes, which catch UI events that would normally go to the desktop shell window and consults the application to determine which user interface events to act on (preventing default operating system behavior), and which user interface events to pass onto the operating system. In order to pass on events to the operating system, those UI events (such as mouse events and keystrokes) can be simulated using operating system calls or posted as system messages to the underlying desktop shell window.

Still further implementations can include an application that hides the desktop shell window and replaces it with a window that duplicates the look and behavior of the desktop. As such, the replacement window would include such functionality as displaying a background image as wallpaper, showing icons for programs, files, folders and shortcuts, and any additional items that the operating system shell window would normally support. The replacement window can support all the normal interactions with items displayed that the desktop shell window provides (such as moving the icons, double clicking icons to open files or programs, right-clicking for a desktop context menu, etc.). The replacement window can also allow interaction with items placed on the background that are actionable (such as buttons, images, videos, text blocks, etc.). A user interface model determines which inputs to redirect or channel to an application, and which should cause normal shell behavior. Such a window can be hidden or exposed by a user, at their option.

DETAILED DESCRIPTION

Numerous specific details are set forth in the following description to convey a more thorough understanding of the subject matter. As such, these details are provided for the purpose of example, and not by way of limitation. Instead, implementations within the scope of the claims may not have a variety of these specific details. For the purpose of clarity, material known to those of skill in the art has not been described in detail, to increase disclosure clarity.

Typically, the term "taskbar" refers to a graphical desktop bar that can be used to launch, monitor and/or switch applications or file system features. Examples of a taskbar (or components that can be included in a taskbar) include a panel, a dock, an icon bar, a start button, start menu/button, a quick launch bar, a system tray, a deskband, a notification area, a system tray, a widget bar, a gadget bar, and an applet bar.

The term "work area" generally is used herein to refer to an area of a GUI, where users can perform work with applications (including applications with window interfaces), as well as store depictions of programs, documents, folders and their shortcuts. Such depictions generally are referred to herein as "work area icon elements", examples of which include elements produced or maintained by a GUI produced by the operating system, such as icons, which can represent programs, documents, folders, gadgets, shortcuts, or widgets, or deskbands, notification areas, and iconified operating system functions, such as a trash icon, a recycle bin icon, a network neighborhood icon, an explorer icon, etc.

A large number of modern operating systems and shells use the concept of a desktop metaphor, which divide the screen area into a taskbar which is always shown "on top" regardless of what application windows are open, and a work area which is shown as the basic area upon which application windows, work area icon elements are placed "above".

In one aspect, an interface to an application is disclosed (e.g., an interface for a user, or for an agent, or more generally, a way to receive inputs). An interface provides a mechanism for getting input from a source to a destination. For example, a source of input can be a user, while a destination can be a particular application, or window, or process executing on a device, such as a device executing a program on a processor. In some cases, the interface can be formed from a number of components. For example, a graphical user interface (GUI) can comprise a display for displaying items graphically (e.g., windows, icons, folders, and other elements), and a user is provided a mechanism for interacting with the GUI, such as a mouse, a touch screen, gesture recognition, a keyboard, a control, a button, a pointer, a mouse, a tactile sensor, a remote interface, a network adapter, motion sensing, gesture sensing, touch pads, and so on. The user views the GUI to obtain feedback about the current state of the device, and to select program or data elements available on the device to activate or to interact with.

A common example interface for a device is a GUI interface shown on a display driven by a device with computational capability, such as a television, a desktop computer, a smart phone, a laptop, a watch, a navigation device, and so on. To the extent that such devices have computational capability, they can be more generally referred to as computers, and this term is used generally to refer to all such form factors and other modes of computational devices, and not restrictively.

The GUI has components that include a wallpaper image that is maintained as the "most distant" displayable component of the GUI from a user. Elements of a desktop GUI typically are overlayed ("closer" to the user) on the wallpaper image, such that the wallpaper image is obscured where the desktop GUI items are located. Windows associated with applications that are active are closer still to the user, such that the GUI items are obscured by the windows. Application windows can obscure each other, depending on which window has an input focus selectable by the user. An operating system (OS) can maintain an inventory of the GUI items on the desktop, and controls which application windows are displayed and have focus. Generally, when no application window has focus, the desktop GUI items can be displayed, and inputs can be received on those items. However, the wallpaper image typically is a static image, and presented to provide a better aesthetic for the user. From one perspective, the desktop GUI can be considered an application that can have focus to receive input.

In one aspect, application functionality is provided without a full application window. In one example, the application functionality is provided by manipulating wallpaper background portions of a GUI and determining whether inputs related to those background wallpaper portions are intended for OS consumption or for the application. The application functionality can be provided while maintaining native operating system functionality, according to exemplary approaches. One term that can be used to describe such application functionality is that the application is an "application with a windowless interface". Similarly, the term "dynamic desktop" can be used to refer to a desktop or GUI interface that allows for applications with a windowless interface according to these examples.

In example approaches, wallpaper is replaced with specially constructed wallpaper, which visually demarcates portions of the wallpaper image from the remainder of the wallpaper image. Inputs to the device, for interaction with the GUI, are monitored to determine whether they relate to the demarcated portions of the wallpaper image (which serve as a windowless interface, as explained below). This monitoring is implemented such that an input related to the demarcated portions is handled by an application associated with the demarcated portions of the wallpaper image, and not by the OS, even though the demarcated portions can be functionally indistinct to the remainder of the wallpaper image in how it is stored and maintained by the operating system. Various examples of how to monitor and handle such inputs are disclosed.

In summary of one approach, code is injected into the program space of the operating system where it can monitor user interface events such as keystrokes and mouse events before they are handled by the operating system. The code can have access to user interface model (can be internal or external to a memory segment in which the code executes) that determines whether a given input should be directed to an application with a windowless interface, or somewhere else. The code can include a map of areas of the screen where mouse events, including movements or clicks, can activate features or routines. The model includes situations where other user interface events such as keystrokes may also have a meaning for the application with a windowless interface. By consulting the user interface model, it can be determined which user interface events to act on (preventing default operating system behavior), and which user interface events to pass onto the operating system. The code also can call routines to determine whether input at a given location is associated with desktop GUI elements, or demarcated portions of the wallpaper image.

The dynamic desktop model is one in which new functionality is interleaved with the operating system's functions such that most of the native operating system's functionality can be preserved, but the application provider can change or override that behavior in certain places on the screen or in certain situations. For example, an input device can be used to guide a cursor to assert or click on a screen region associated with a code segment, which can be interpreted to activate an application-driven menu corresponding to that code segment, in which case the event would not be passed to the operating system 204, to prevent it from also showing a default menu or contextual menu at the same place. However, if the user used input device 104 to click on a desktop icon 310 or 312 placed by the operating system, the code 202 passes messages through to the operating system 204 to allow default behavior to occur.

In a particular example, code for monitoring such inputs can be provided as a shell extension, and which can communicate with an application running as a normal application in the application layer.

Further details will become clearer in view of the following disclosure.

FIG. 1 depicts a diagram of an example system in which input device(s) 25 (e.g., a mouse). A device driver 21, is depicted as executing with an operating system 20. The device driver 21 receives relatively raw, unprocessed inputs from input device(s) 25 and produces outputs that can be processed by a messaging system associated with the operating system, or a messaging API that provides inputs to an appropriate destination or destinations. For example, messaging subsystem can message an application that has focus with an input determined by operating system 20 to be related to that window (such as a mouse click, or keyboard input).

In FIG. 1, a shell process 5 maintains a desktop GUI 34 (depicted in subsequent Figures) that has GUI items. The shell process 5 can be considered part of the operating system 20, but for clarity it is depicted separately. A message hook 8 is shown to receive inputs (e.g., messages from operating system 20, which represent outputs of device driver 21, in an appropriate format for the particular OS being used.) Message hook has a messaging channel 14 (or more generally, a way to communicate) with an application 11. Similarly application 11 can generate messages (e.g., response 12) that are received by message hook 8. Message hook 8 also can generate messages that are received by a message hook 7, which in turn can communicate with an application 10, and similarly, a message hook 6 can receive outputs from message hook 7, and communicate with an application 9. Dashed lines depict that message hooks 6 and 7 and their corresponding applications 9 and 10 are optional, but are depicted to show that a plurality of such hooks and applications can be provided. Such message hooks can be implemented as shell extensions, such as extensions to Microsoft Windows Shell, and/or a Component Object Model ("COM") object that extends the default shell. For example, the Windows API call SetWindowsHookEx can be used to set a message hook in an implementation using Microsoft Windows. SetWindowsHooEx accepts different kinds of message hook types, and some example hook types of interest include WH_KEYBOARD and WH_MOUSE, which are called when keyboard and mouse events are to be processed, respectively. Code implementing message hooks can be stored in a Dynamic Linked Library (DLL). Message hooks in Microsoft Windows are linked in a linked list, which is represented by the chain of message hooks displayed in FIGS. 1 and 2.

Each message hook 7-9 has a loosely coupled (dynamic) connection to its respective application, to provide isolation from errors in the application that could affect OS 20. For example, if an application terminated without closing its message hook, its message hook can timeout if it receives no response to a message sent to its application, and then essentially treat itself as being transparent by passing through all input events, rather than filtering some events to its application. If the application were restarted later, its message hook may automatically reacquire a connection to it and passes user input events normally again. This approach allows the applications to be closed, updated or even crashed in most cases without affecting the shell or the OS 20. A message hooks can communicate with a separate process that maintains the user interface model used by the message hook to filter inputs by means of a standard inter-process communication defined in the operating system. Examples of modes of inter-process communication include shared memory regions, sockets, pipes, mailslots, file mapping, data copying, and Compound Object Model (COM), The process maintaining such user interface model (accessed by the message hook) can run at an application level in OS 20, and would not generally need kernel privileges.

GUI 34 is outputted for display on a display 35 through a graphics processor 33. API calls can be provided by operating system 20 to access graphics processing 33. A video memory 30 is depicted, which stores data for graphics processor 33. Video memory 30 is depicted as having a reserved location for a wallpaper image 31 (wallpaper 31). Wallpaper 31 can be stored in such video memory to increase performance, because its content can be more frequently needed than other content. From a user-level perspective, the space used to store wallpaper 31 already has been consumed, and thus changing wallpaper 31 generally consumes no further system resources that have not already been occupied.

Also, by drawing on the wallpaper, reserved video memory for wallpaper 31 can be used efficiently and if application 177 is opening, is closed or crashes, the displayed wallpaper 31 is kept static in memory.

Figure 2:
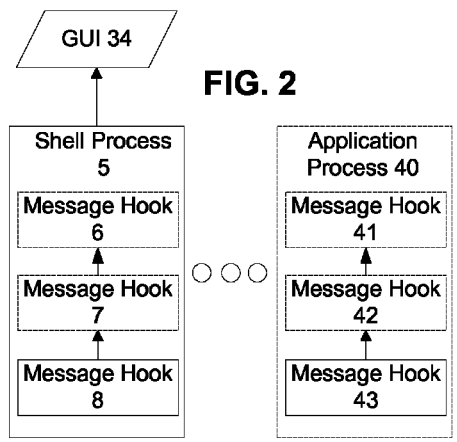
FIG. 2 depicts another perspective on an arrangement of a subset of the elements depicted in FIG.

FIG. 2 depicts that shell process number 5 comprises message hooks 6-8, as explained with respect to FIG. 1, shell process 5 maintains GUI 34. In some operating systems, the existence of the message hooks 6-8 implies the existence of message hooks in the processes corresponding to applications which currently are running or otherwise memory resident on the system. FIG. 2 depicts such a situation with message hooks 41-43. As shown, message hook 43 corresponds with message hook 8 in shell process 5. Thus, when application process 40 has focus (it is to receive inputs from one or more user input devices) message hook 43 first receives messages indicative of such inputs. For example, messages can contain mouse position information, keyboard entry information, mouse clicks, or other information generated through other available user interfaces. As will be explained in further detail below message hook 43 contains a model to determine whether any of the inputs described in messages received map to any corresponding input of interest to its application. If a message describes an input of interest to its application, message hook 43 will message its corresponding application (as in FIG. 1), and if a given input does not map to an input in the model of message hook 43, then message hook 43 will cause that message to travel up the chain of messages to be received by message hook 42, which in turn repeats the process described with respect to message hook 43.

More particularly, some operating systems, such as Microsoft Windows, provide implementation of global hooks, which by their very nature are instantiated or otherwise injected into the code segment of any running process including the depicted processes of the shell process 5 and application process 40. Thus, FIG. 2 depicts a situation relevant to an implementation of the disclosed aspects in a Microsoft Windows environment. However, the disclosed aspects are in no way limited to use in a Microsoft Windows environment, and FIGS. 3 and 4, described below, disclose other examples, which can be used both in a Microsoft Windows environment and in other operating system environments.

Figures 3, 4:
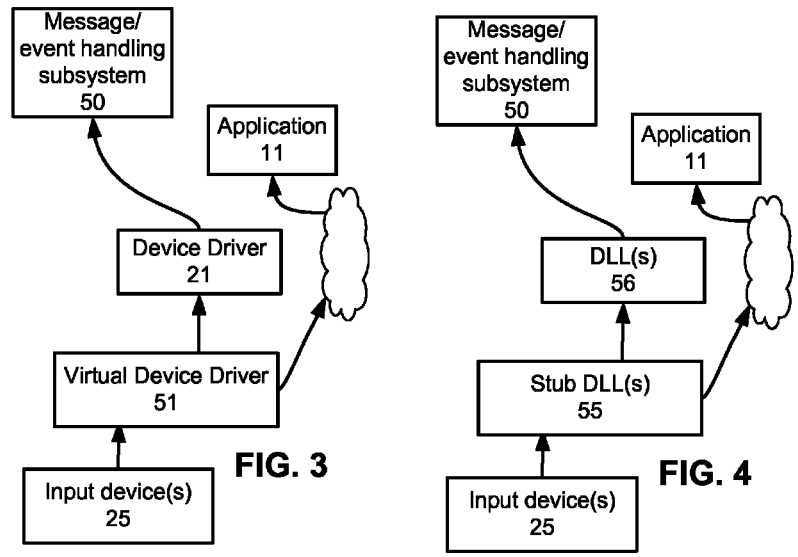
FIG. 3 depicts a block diagram where a virtual device driver can implement aspects of functionality provided by message hooks in FIGS. 1 and 2.
FIG. 4 depicts a block diagram of using stub DLLs to implement aspects of functionality provided by the message hooks of FIGS. 1 and 2.

FIG. 3 depicts that input devices 25 can generate inputs which are received by a virtual device driver 51. Virtual device driver 51 intercepts messages from input device 25 which are to be received by its normal device driver 21, which typically is provided by a vendor of input device 25. Virtual device driver 51 has access to an input model, which is used to determine whether a given input from input device 25 is of interest to an application 11. For example, virtual device driver 51 can maintain or access a model of demarcated sub portions of a workspace in GUI 34. When an input, such as a mouse click, is received in any of those demarcated areas virtual device driver 51 can determine that this mouse click is relevant to application 11 and can divert a mouse click from device driver 21 to be received by application 11. However, if the input model maintained by device driver 51 finds that a given input sent to it from input devices 25 is not relevant to application 11 then virtual device driver 51 will cause that input to be received by device driver 21, as though virtual device driver 51 did not exist. In turn device driver 21 can stand or otherwise provide a message describing the input event to or through a message for event handling subsystem 50. By contrast with the approach depicted in FIGS. 1 and 2, virtual device driver 51 maintains the input model mapping input events to an application at a lower level, in particular message hooks 6-8 and 41-43. Each typically execute in application space, while virtual device driver 51 can execute within kernel space or within another protected memory location. For the sake of this description virtual device driver 51 also can be viewed as injecting code into an application space such that the code intercepts inputs and filters or otherwise redirects certain inputs to be received by one or more applications which have been registered to receive such inputs.

FIG. 4 depicts another example of code injection to accomplish this basic approach or purpose. Here, input device 25 communicates input events to a stub DLL 55, through any number of potential intermediate steps. Stub DLL 55 maintains or otherwise has access to an input model, as described with respect to FIGS. 1, 2, and 3. Stub DLL 55 uses that input model to determine whether to allow a given input to be propagated to a DLL 56, which in turn can provide that input event to message event handling subsystem 50, or to cause that input event to be communicated to application 11, again through one or more intermediate communication steps.

Figure 5:
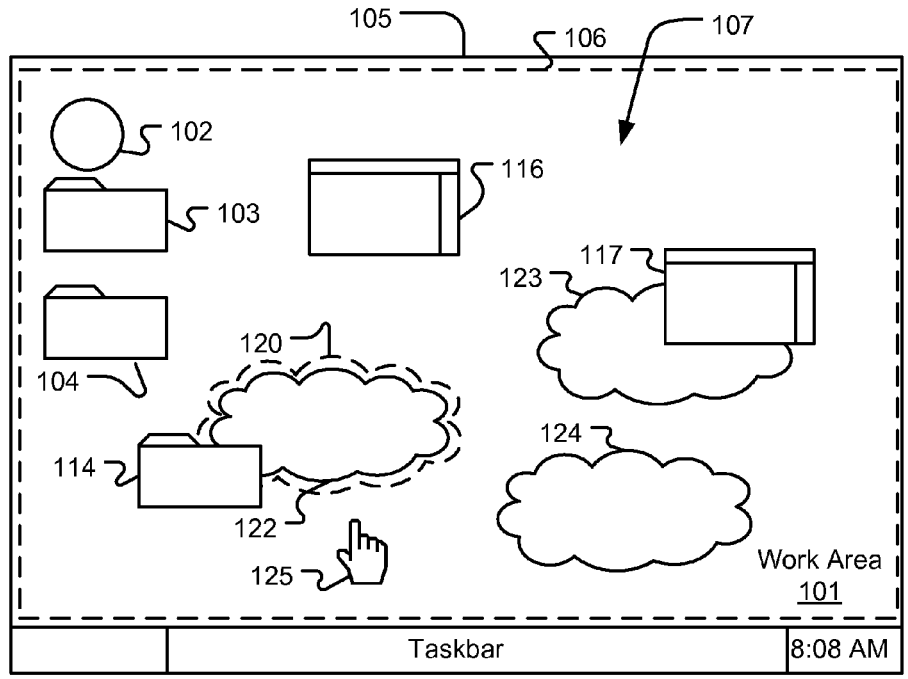
FIG. 5 depicts a screen view where portions of a work area are allocated to one or more applications, such that interaction with them can in some instances implement activate application functionality, and where such portions can be obstructed by active application windows and GUI items, such as folder icons.

More details concerning the input model referenced with respect to the above description and Figures are provided below with respect to FIGS. 5, 6, and 7. Turning now to FIG. 5, an example of GUI 34 adapted to implement disclosed aspects is depicted. A displayable portion of GUI 34 is identified as 105, while a work area 101 occupies a subset of that space, excluding a task bar. Wallpaper 107 is generally indicated as being behind work area 101. Some elements depicted in FIG. 5 are maintained by an operating system such as operating system 20 of FIG. 1. For example, icon 102, folder icons 103, 104, and 114, a pointer 125, and application windows 116 and 117. A number of defined or demarcated portions of work area 101 are also depicted. As introduced above and explained in further detail below, these portions can be part of or assigned to input models for one or more applications which are monitored by one or more message hooks, virtual device drivers, Stub DLLs, or another approach described herein. A first demarcated region 120 is shown in dashed lines, while a visually distinguishing element 122 is depicted as being within region 120. As introduced in FIG. 1, element 122 can be a part of wallpaper displayed in work area 101, for example. Element 122 can be a picture or pictures, and region 120 is defined to encompass or otherwise bound those picture or pictures. FIG. 5 further depicts that folder icon 114 can obscure element 122, e.g. if element 122 is a picture contained in wallpaper on work area 101 then folder icon 114 maintained by the operating system or a shell process, would be displayed over that picture such that a portion of that picture can be obscured. Similarly, application window 117 can obscure some of sub portion 123. Sub portion 124 also is depicted. Typically, it is envisioned that sub portions 120, 123 and 124 will be identified or otherwise demarcated with a visually distinguishing characteristic provided on work area 101, and in a particular example on wallpaper 31. For example, distinct graphics or pictures can be located within each of sub portions 122, 123, and 124. Further detail relating to the significance or applicability of these disclosures is provided below.

Figure 6:
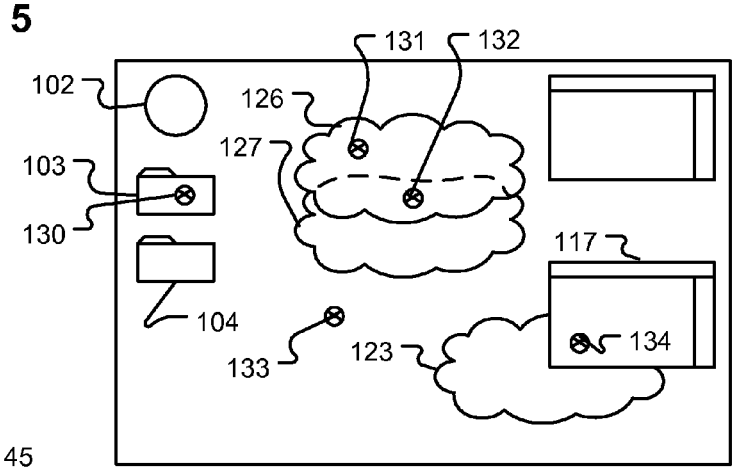
FIG. 6 depicts a view where interaction is depicted at various exemplary points in the work area, with results described.

Turning to FIG. 6, examples of input events relating to work area 101 and elements depicted therein is described in further detail. Similar to FIG. 5, FIG. 6 depicts icons maintained by a GUI such as folder icon 103, sub portions of work area defined by one or more applications such as sub portions 123, 126 and 127, and application windows such as application window 117. As a first example, folder icon 103 is shown to have an input event 130 associated therewith. Input event 130 can be determined to be associated with folder icon 103, because it is received in a location of work area 101 in which folder icon 103 is disposed. As will be explained below, locations of such GUI elements as folder icon 103 can be maintained by a shell process, such as shell process and five depicted in FIGS. 1 and 2. An input event 133 is depicted as being received in a location of work area 101 in which no element of the GUI is present, application window 117, or are any of sub portions 123, 126, or 127. Thus, input event 133 would be received by shell process 5, as input event 133 is directed to a portion of work area 101 occupied only by a static portion of the wallpaper image.

By contrast, input event 131 is received in a location within sub portion 126, further input 131 is not in a location within any application window or where any icon of the GUI is maintained. Therefore, input 131 is determined to be associated with sub portion 126, and in turn sub portion 126 is associated with an application. By virtue of that association input event 131 is redirected or messaged to that application and is not received by shell process 5, as would be the typical case with a normal desktop GUI interface. In a further example, an input event 132 is depicted as being located in an overlapping area of sub portion 127 and sub portion 126. In such a circumstance, an order of precedence between sub portions 127 and 126 can be enforced. A variety of example mechanisms to produce such an order of precedence are disclosed herein. Sub portion 123 and application window 117 partially overlap. Because input event 134 is located within a boundary of application window 117, a process associated with application window 117 will receive that input event even though the location of input event 134 is also within sub portion 123.

These effects can be produced by a message hook that executes within an application that currently has focus. For example, when no other application has focus, shell process 5 has focus and the work area 101 is displayed in its entirety in the absence of application windows. A messaging hook that executes in shell process 5 would receive input events and can query a list process maintained by shell process 5 to determine locations of icons in work area 101, and can query another process that maintains a definition of sub portions of the work area 101 associated with one or more applications. Comparing these locational inputs with a location of an input event, the message hook can determine whether the input event is outside of any actual item of the GUI yet is within a sub portion associated with an application.

Figure 7:
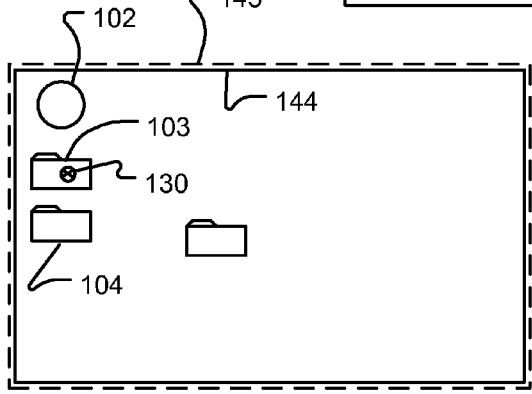
FIG. 7 depicts an example where an entirety of the work area is allocated to an actionable area associated with an application.

FIG. 7 depicts a further example in which a work area 145 is occupied entirely by a sub portion 144 associated with an application, such that any input event that is not otherwise in a location occupied by an application window or by an icon of the GUI is to be associated instead with the application. In this case, input event 130 would be received by shell process 5, because it is within a location occupied by folder icon 103.

Figure 8:
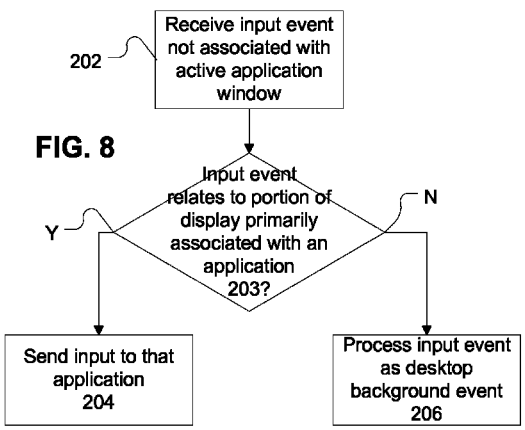
FIGS. 8-10 depicts flows for example methods that can be implemented with the interface examples herein.

FIG. 8 depicts an example method that can be performed by a message hook or by code executing elsewhere in a system in order to determine whether an input is to be considered received by a sub portion of a work area and not by a shell process or by an application in focus. An input event not associated with an active application window can be received (202). A determination (203) can be made as to whether or not that input event relates to a sub portion of a display that is primarily associated with an application. Here, primarily associated indicates that there is no GUI element such as a GUI icon that should take precedence to receive that input. Further, this determining also implies that the input event is found to be related to a location in a GUI that has been associated with an application, as depicted by sub portions 120, 123, or 124 in FIGS. 5, 6, and 7.

If this condition is true, then the input event is directed (204) to the application associated with the portion of the display associated with a location of the input event. However, if the condition is not true, the input event is provided for processing as a normal desktop GUI event, which can include that the input will pass on the input event, so that the event can activate a resource represented by an icon, such as opening a folder or loading an application or simply interacting with a contextual menu available by right clicking. Thus, FIG. 8 depicts a situation where a messaging subsystem of an operating system determines which application process will receive a given message for input event. Based on which application window is active (has focus), and only if the input event relates to a portion of the display that is not occupied by GUI elements maintained by a shell process would an application associated with that portion of the display potentially receive that input event through a message redirection technique. FIG. 8 is organized to disclose that in some cases, the question of whether an active application window is located where an input event was provided is handled through OS 20 maintaining status of which window has focus to receive inputs, such that code provided by the message hook operates to redirect messages within a shell process, based on comparing locations of elements of the GUI to pre-defined sub-portions of the work area of the GUI.

Figure 9:
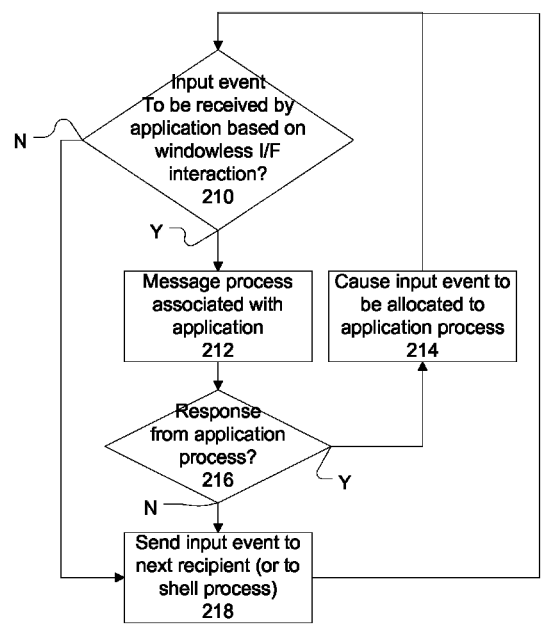

FIG. 9 depicts a method according to these aspects. In FIG. 9, the method relates to an input event that has been determined to be redirectable to an application based on the method depicted in FIG. 8. In particular, a determination that an input event is to received by the application (210) causes that input event to be messaged to a process associated with the application (212). Thereafter, the message hook or other code, which performed determination (203) would wait for a response from that process (216). If the response is received, then the input event is allocated to that application process (214). However, if a response is not received within a required time limit, the code performing determination (203) instead allows the input event to propagate (218) according to a normal chain of messaging. For example, the input event can be propagated to shell process 5 in the system of FIG. 1. The propagation (218) can be implemented by generating a message or by allowing the message received by the process performing determination (203) to continue propagating in a pre-defined message chain.

Figure 10:
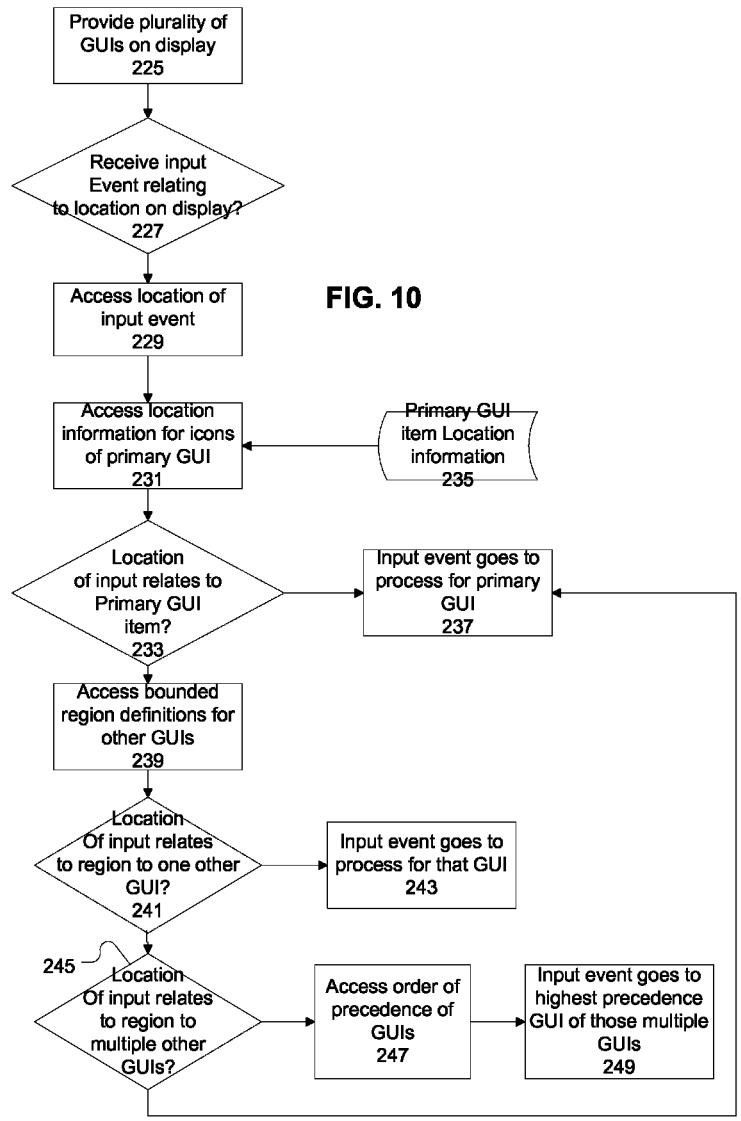

FIG. 10 depicts an example method where a number of GUIs can be maintained or provided by a device coupled to a display. A plurality of GUIs can be provided (225) for display. If an input event relating to a location on the display is received 227, a location of that input event is accessed (229). Locational information for icons of a primary GUI are accessed (231) from a source of primary GUI item location information (235). A determination (233) is made as to whether or not the location of the input event relates to any item of the primary GUI. If so the input event is directed to a process associated with the primary GUI (237). That process can activate an application or take some other action as specified by an input model. However, if the location of the input event does not relate to a primary GUI item, then definitional information for bounded regions of other GUIs is accessed (239). If the location of the input event relates to a region for only one other GUI, then the input event is directed to a process associated with that GUI (243). If the location of the input event relates to more than one region (245) then information descriptive of an order of precedence of the GUIs is accessed (247) and the input event is directed to the GUI that has the highest precedence of the multiple GUIs related to the location of the input event (249). However if determinations (241) and (245) both are negative then the input event is not associated with any GUI and as a default the input event can be sent to the process for the primary GUI (237). In a particular example, the primary GUI can be maintained by the OS shell (e.g., shell 5), while other GUIs can be associated with different applications.

Figure 11:
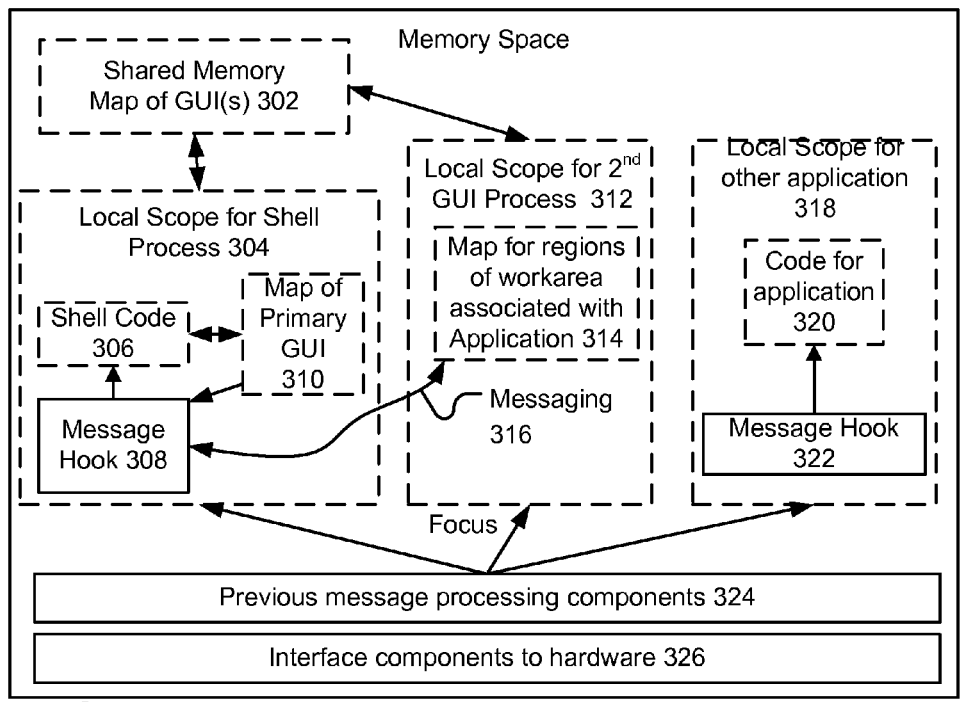

FIG. 11 depicts an example allocation of memory space in a system implementing aspects disclosed herein. HW interface components 326 interface with messaging components 324 to forward received input event messages. Depending on a focus in the GUI, a given input event message can be sent to a local scope for shell process 304, a local scope for second GUI process 312, or a local scope for an application 318. Local scope for shell process 304 includes message hook 308 which can communicate with code for shell 306. Shell code 306 also communicates with a map of a primary GUI 310. In particular, shell code 306 can maintain the map when icons or other GUI elements are moved, deleted, or added. Also, message hook 308 can query the map of the primary GUI 310, because message hook 308 executes within the local scope 304 for the shell process.

In one usage of the aspects disclosed herein, an application linked to a message hook can update a wallpaper background with a number of images for viewing by a user. For example, the images can be images of interest to the user, such as a collage of a selection of pictures taken at an event, or a set of visual tags of people, activities or interests relevant to the user. The user can hover, or double click in areas where such pictures or other icons are displayed. The message hook can detect such events by using its user input model and an available map of the displayed elements of the desktop GUI. The message hook can send messages for detected input events to the application, which can respond by opening a full application window, where the user can further interact with other content. In some implementations, the application can be installed by a user, and while the application is running, the application performs the example input event filtering and other actions described herein. The application can be distributed on a tangible medium, or downloaded, file shared, and so on.

Message hook 308 also can communicate via messaging 316 with a map 314 for portions a work area of the GUI that are associated with an application, such as those sub portions depicted and described with respect to FIGS. 5, 6, and 7. For example, map 314 can contain coordinates of corners of a rectangular sub portion of the work area. More complicated sub portion shapes can be defined according to any technique that allows a programmatic determination of whether a given location is within or without the sub portion. As described with respect to the methods depicted in FIGS. 8, 9, and 10, map 310 and map 314 can each be referenced by message hook 308 in determining whether or not to redirect a given input event from shell code 306 to an event handler for the application with the second GUI process.

Similarly, if application 318 has focus then a message with an input event will be first received by message hook 322, which can be another instance of message hook 308. Here however, because message hook 322 executes in a process other than shell process, it is definitional that the input event will not be primarily associated with the application having the second GUI process. As such, message hook 322 would not typically redirect messages that it receives and instead those messages would be propagated to application code 320. Message hook 322 thus is primarily depicted to show that a message hook can be loaded by an operating system or other boot code into a memory segment for an application even though the message hook functionally will be transparent to input events that it receives.

Figure 12:
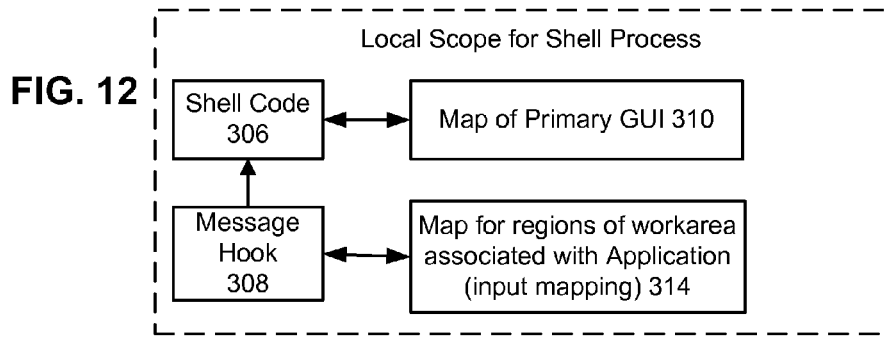

FIG. 12 depicts a further example of how a message hook can access a map for regions of a work area associated with an application as well as a map for elements of a primary GUI. In the example depicted, message hook 308 does not communicate with a separate memory segment to obtain information about regions of a work area associated with an application, but instead map 314 is stored within the local memory scope for the shell process itself. More particularly, FIG. 12 depicts that message hook 308 can communicate with shell code 306 which can include an input event handler, as well as the map 314 which contains information defining regions of a work area associated with one or more applications (consider the example work area sub portions depicted in FIGS. 5, 6, 7). The shell code 306 also accesses and otherwise maintains a map of primary GUI elements 310. Message hook 308 can access a function in shell code 306 to obtain definitional information for locations of primary GUI elements. As such, FIG. 12 depicts that rather than messaging across to local memory scopes a message hook can instead maintain a map locally. Such an implementation would cause the memory footprint of memory hook 308 and map 314 to be greater than a memory footprint only for message hook 308. However, this is an alternative implementation that is acceptable, and may not present appreciably higher overhead, especially where the information contained in map 314 is not overly large, for example if the regions of the work area are regular they can be defined with relatively small amounts of data.

Figure 13:
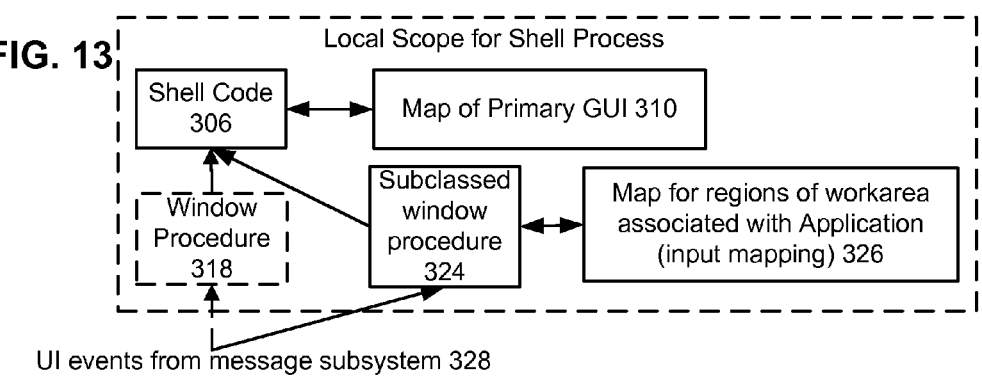

FIG. 13 depicts a further example implementation in which GUI events are received from a message subsystem 328. Typically, a window procedure 318 would receive such a UI event; however, that window procedure can be subclassed to produce a subclassed window procedure 324, which can interface with a map 326 for regions of a work area associated with one or more applications. That subclassed window procedure 324 also can communicate with shell code 306 to pass on inputs that would be found unrelated to regions of the work area associated with those applications as defined by map 326. As in FIG. 12 shell code 306 may maintain and access map 310 of primary GUI elements and provides such information to subclassed window procedure 324 according to a procedure.

The above disclosure and Figures provide a plurality of examples for providing an active wallpaper interface in which regions can be defined and associated with a respective input model. Those regions can be mapped and such map information can be stored for access by a message hook or other code injected into a process that currently has focus to receive inputs. The map data itself can also be loaded into such process or can be maintained in a separate process and queried by the message hook when necessary. When a shell process which maintains the wallpaper and a primary GUI interface has focus, the message hook executes in a memory segment for that shell and can access locational information for GUI elements located by the shell. It also was described that alternative implementations can provide stub DLLs or virtual device drivers instead of or in addition to the message hook implementations, which serve as primary examples. Further, an extensible number of GUIs can be provided and an order of precedence enforced among them, as explained with respect to FIG. 10.

Examples thus far have as a common attribute that input events are filtered or redirected by code injected into an operating system or application space that can intercept such input events before they are acted upon by an application or the duty maintained by the operating system itself. Still further examples can be implemented, which do not depend upon virtual device driver filters Stub DLLs or message hooks. Some examples of these implementations are described as follows.

FIG. 14 depicts work area 101 with wallpaper 178 on wallpaper 178 is located several distinguishing regions 177, 176 and 175. For example portraits are pictures can be located in these areas of wallpaper 178. Over each of these areas is located a prospective transparent window which is produced by an application or applications. In particular, transparent window 120 is located over region 176, window 123 is located over region 175, while window 124 is located over region 177. Because regions 175 176 and 177 are defined in background wallpaper they can be obscured by an application window 117. By contrast with previous examples transparent windows 120, 123, and 124 are equivalent or interchangeable with application window 117 (i.e., full windows instantiated through the OS, instead of "virtual" windows managed by detecting locational attributes of input events); the distinction being that they are transparent rather than having typical elements associated with an application window such as an opaque background buttons for maximization and minimization scrollbars and the like.

An operating system maintains a Z order for all active windows, including window 117 and transparent windows 120, 123 and 124. By ensuring that the transparent windows have a relative Z order directly above the background wallpaper and underneath all other application windows, a similar effect to the examples described above can be obtained. For example, so long as the Z order for window 117 is "in front" window 123, then an input event received in a location where those windows overlapped will be perceived by window 117 and not window 123 which is the result desired.

Here however the user can have shortcuts which may disturb the operation of such a system unless further measures are taken. For example a user may activate a show desktop button which would functionally cause all application windows to be minimized. In such a case, transparent windows 120, 123 and 124 would be minimized along with application window 117, even though windows 120, 123 and 124 are transparent and would, in essence, not be readily discernible by the user.

FIG. 16 depicts an example approach to handling such a situation. In FIG. 16 and application maintaining transparent windows 120, 123, 1 to four can detect (356) a show desktop event, and respond by replacing (358) the transparent windows in the appropriate Z order. The result would be that application window 117 would be minimized, while transparent windows would be maintained in the ordering that would allow desired interactions with the distinguishing areas of the wallpaper.

FIG. 15 depicts that an API 354 can be provided by an operating system 350 to adjust Z order for windows, and operating system 350 would maintain the GUI map 352 accordingly.

FIG. 17 depicts further disclosure relating to the example of FIG. 14. In particular, FIG. 17 depicts that a wallpaper is last in Z order (i.e. it is farthest from the viewer), followed by desktop shell GUI 178, and a series of transparent windows, such as windows 124, 120, and 123. These transparent windows are in turn followed by application windows 116 and 117. In this example application window 117 would have focus as it has highest Z order. Each window depicted is associated with an input procedure that in turn communicates message events to associated application code. For the sake of example, input procedures 402, 404, 406, 400 80 410, 412 are depicted with arrows illustrating an order of precedence for the input procedures corresponding to their relative Z order. Thus, for any given location within work area 101, the input procedure associated with the window that has the highest Z order and which is situated in that location would receive an input event in that location. In turn, that input procedure would use that input event according to its associated application code. In this example application code 414 is associated with input procedure 402 application code 416 is associated with input procedure 404, and application code 418 is associated with input procedures 406, 408, and 410. Finally, input procedure 412 is associated with application code for shell 420.

The collection of FIGS. 18, 19 and 20 are used to describe a further example implementation. FIG. 18 depicts a basic desktop GUI 105 that includes elements 102 103 and 104. FIG. 19 depicts a replica 182 of this desktop GUI where replica elements 183, 184, 186 correspond to elements 102, 103 and 104. In addition, sub portions of replica GUI can be identified, such as by using distinguishing graphics. For example, graphics 175 and 176 are provided on replica desktop 182. Transparent windows 180 and 175 are superimposed on sub portions 176 and 175, respectively. A Z order of these elements is depicted in FIG. 20. As before, wallpaper 107 has lowest Z order, while desktop shell GUI 105 (i.e. the real desktop GUI maintained by the operating system) is disposed next in Z order. Thereafter, desktop shell replica 182 and one transparent window 180 can be provided next in Z order (they can be made interchangeable in Z order), followed by transparent window 123.

An input event model is provided by the application that maintains the GUI replica 182 and enforces the depicted Z order. The input event model is used to detect whether a received input event is over locations occupied by elements of the true desktop GUI 105 and, if so, messaging provides those input events to the desktop GUI event handler, or otherwise takes the same actions that the desktop GUI would take if it had received those input events directly. An input event directed to application window 117 would not need to be processed by the input event model, that input event would be directly received by the event handler for that application window.

With an input event model can detect when input events are directed to distinguishing regions 175 or 176 and take appropriate action.

Figure 21:
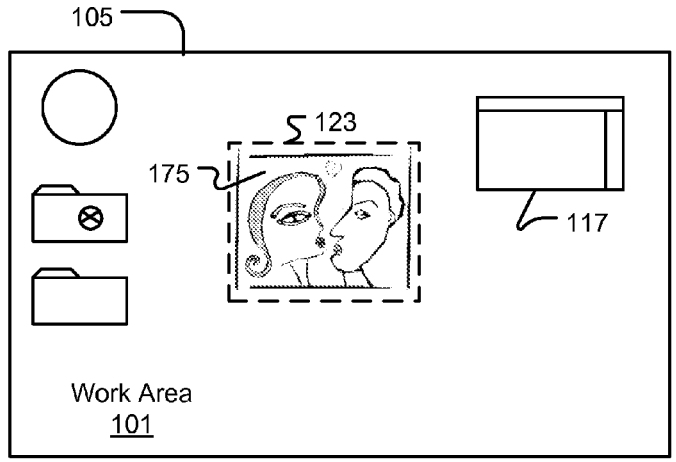
FIGS. 21 and 22A-22B depict screen displayed used for illustrating aspects of screen resizing.
Figure 22A:
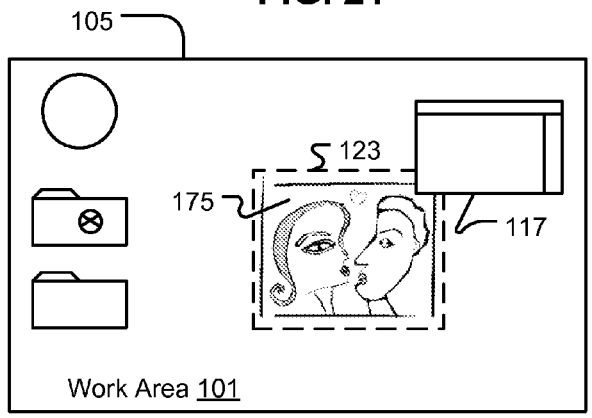
Figure 22B:
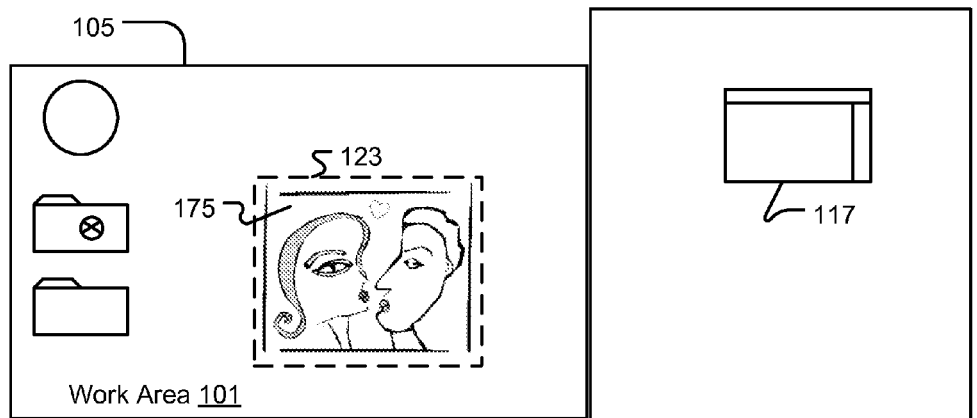

FIGS. 21, 22A, and 22B are provided for describing aspects of work area resizing. FIG. 21 depicts work area 101 at a certain resolution and includes application window 117 sub portion 175, which is bounded by region 123. If resolution is decreased then the wallpaper of work area 101 can be readjusted and in such a circumstance sub portion 175 may ultimately overlap with application window 117. However as shown in FIG. 22B, the work area also can be expanded in size and application window 117 can be located in a separate screen portion. Sub portions of the work area 101 can be resized, rearranged, deleted, or added according to the available screen real estate.

Figure 25:
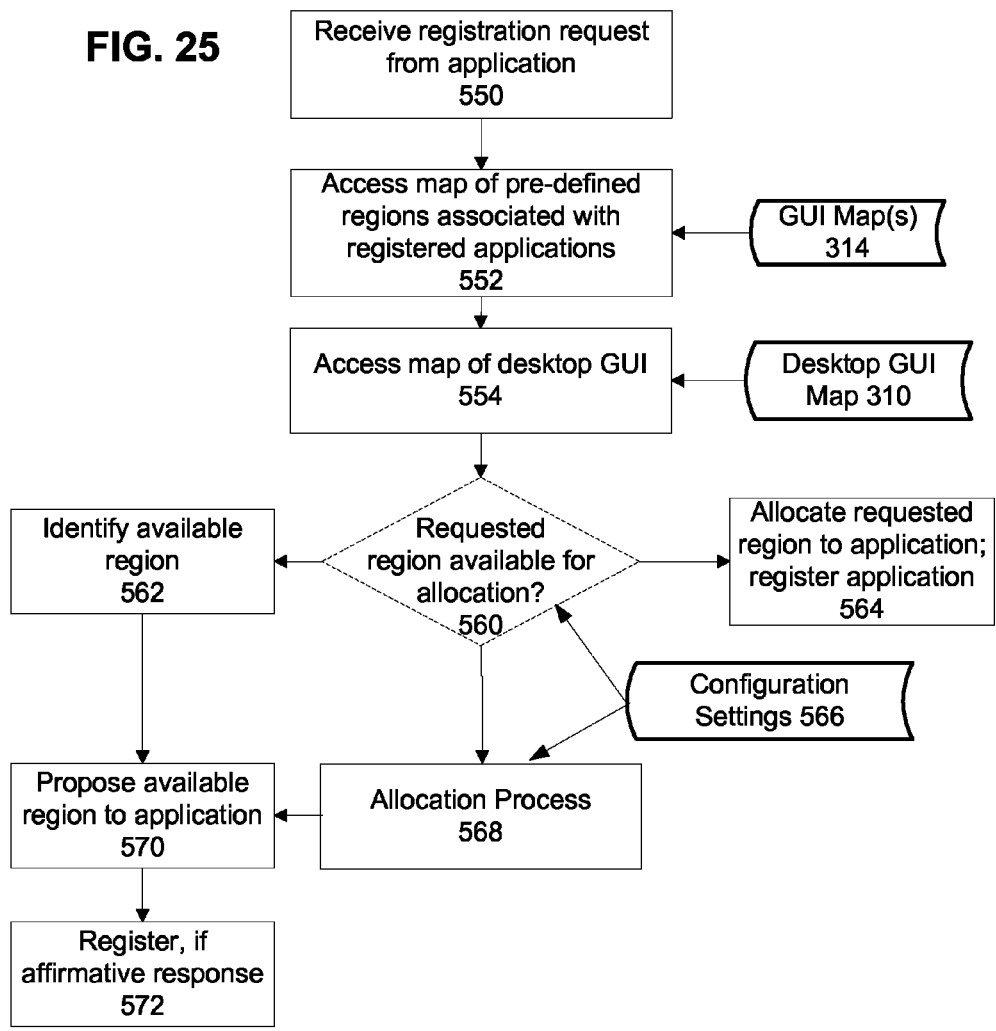
FIG. 25 depicts an example method for implementing API functionality.

The above disclosure explains how applications can be associated with sub portions of wallpaper, such that they can be activated or otherwise present outputs without having fully instantiated application windows. An approach can be provided to maintaining an API for registering applications to enable such results. FIGS. 23-25 present disclosure relating to such an approach. FIG. 23 depicts that a new application component 502 and a registered application component 512 each can communicate with an API 506.

Registered application 512 maintains a GUI map 514 which defines sub portion 522, which has been accepted by API 506, such that sub portion 522 would be active for application component 512. New application component 502 establishes a proposed GUI map 314; proposed GUI map 314 represents a definition of proposed sub portions of a GUI, which the application desires to have associated with application 502 (here, GUI map 314 defines sub portion 520).

API 506 can receive GUI map 314 or other equivalent definitional data for the sub portions it defines. API 506 can consult a master GUI map 510 as well as a desktop GUI map 310 that defines locations for GUI elements maintained by the operating system. As shown initially, the proposed sub portion 520 overlaps with registered sub portion 522. API 506 can instead propose to new application component 502 a different location. API 506 also can request registered application component 512 to approve moving sub portion 522. Still further, API 506 can conduct a resolution process involving a variety of heuristics or criteria that can allow maximization of value, such as giving precedence or priority to applications which may result in more revenue, and forcing a pre-defined sub portion to be moved, deleted, or resized. In still other implementations, sub portion 520 may be allowed to overlap with sub portion 522, and an order of precedence would be established between them to determine which sub portion should receive an input in the overlapping area, such as disclosed with respect to FIG. 10.

FIG. 24A and FIG. 24B depict further example functionality that can be implemented by API 506 or any other process maintaining GUI map data described herein. For example FIG. 24A shows that sub portion 518 currently overlaps with folder icon 524. API 506 can force folder icon 524 to move to a non-overlapping location as depicted. FIG. 24B depicts that API 506 can instead move sub portion 518 to another location which is free of desktop GUI elements. Such behavior can be subject to configuration settings available to a user installing an application with API 506.

FIG. 25 depicts an example method that can be implemented by API 506 in registering new applications or new sub portions of existing applications. A registration request can be received (550) from an application and in response a map of predefined regions already associated with registered applications can be accessed (552). GUI map 314 is depicted as being available stored data input to accessing (552). Similarly, a map 310 of desktop GUI elements can be accessed (554). A determination whether the requested region is available for allocation to the application requesting registration can be made (560). An input to this determination can be a variety of configuration settings (566); such configurations include those examples described above, such as whether or not a user would allow moving of desktop GUI elements, resizing of existing predefined regions and so on.

If the requested region is available, it can be allocated (564) however if the requested region is unavailable such as because it is in whole or in part already occupied by another predefined region or by a desktop GUI elements, then a plurality of parallel paths can be taken. A resolution process to determine a region available for allocation can be made (568); such resolution process can involve bidding among competing applications, user input, heuristics and other mechanisms to allocate available screen real estate. Any such identified regions can be proposed to the application requesting registration (570) and upon reception of an affirmative response the application can be registered and that proposed available region can be assigned to that newly registered application (572).

Figure 26:
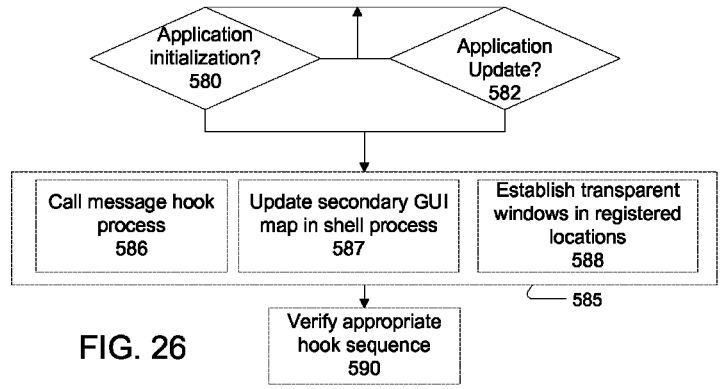
FIG. 26 depicts an update process for changing content displayed in work areas, and portions allocated to applications, which can relate to where such content is displayed.

FIG. 26 depicts a maintenance process that can be conducted in order to maintain sub portions assigned to one or more applications. In one example, when an application initializes (580) or when an application updates (582) a process of updating (585) registered sub portions of a GUI interface can be conducted including calling message hook processes 586 updating secondary GUI maps located in shell processes 587, or establishing transparent windows and registered locations 588. Each of these steps is appropriate for one or more of the implementations disclosed above. A step of verifying an appropriate hook sequence also can be conducted (590).

Figure 27:
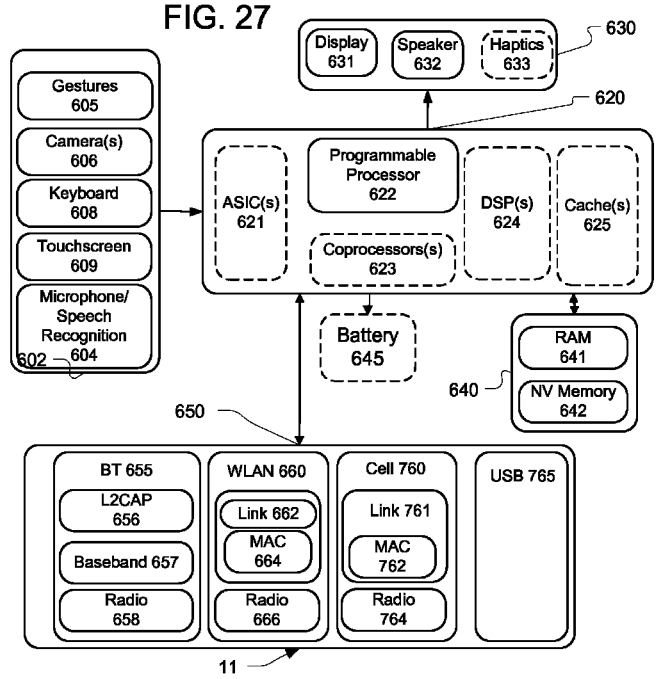
FIG. 27 depicts an example modular view of a device that can be used in implementing aspects of the disclosure.

FIG. 27 depicts an example construction of a device in which these aspects can be implemented. A processing module 620 may comprise a coprocessor 621, digital signal processors 622, or more cache memories 625 and ASICs 621. Processing module 620 interfaces with memory module 640 which may comprise elements including random access memory 641 as well as nonvolatile memory 642, which can include flash memory, hard drives, disc drives, optical drives, thumb drives, or any other form factor or technology for data storage.

A user interface module may comprise a plurality of user input modes including gestures 605, one or more cameras 606, a keyboard 608, a touch screen 609, a microphone coupled with speech recognition 604. Output processing module 620 can be provided through an output module 630 which may comprise components including a display 631, speaker 632, as well as haptics output 633. A network interface module 650 comprising a plurality of network interface capabilities also may be available. Examples of network interface capabilities include Bluetooth 655 which comprises layers including L2CAP 656, baseband 657, as well as a radio 658. A wireless LAN 660 may be provided which also includes a link 662 and media access controller (MAC) 664 as well as a radio 666. A cellular interface also may be provided 760 which in turn includes a link 761, a MAC 762 and a radio 764. Radio 658, 666, and 764 may be shared or distinct depending upon implementation. Such radios made be implemented as a combination of software and hardware. Other examples of data interfaces include Universal Serial Bus 765.

Although the foregoing embodiments have been described in some detail for purposes of clarity of understanding, the invention is not limited to the details provided. There are many alternative ways of implementing the invention. The disclosed embodiments are illustrative and not restrictive. Input devices comprise any human or machine input interface device, by way of example, and not limitation, keyboards, keypads, mice, touchpad's, pointing sticks, trackballs, light pens, touchscreens, graphics tablets, light guns, joysticks, motion sensors, microphones, and dance pads.

Of course, the example system 1100 is provided by way of example and not limitation as to what kinds of devices may be used in implementing aspects disclosed herein. Those of ordinary skill in the art may adapt the disclosures presented herein for use with a variety of devices, such as smartphones, tablet computers, laptops, and so on, which may be implemented using components that are more or less integrated than those depicted herein, and which may include more functionality or fewer functions than what is depicted in this example.

Implementations according to these disclosures can be distinguished from infrastructure provided by operating systems or vendors to modify background wallpaper images, which can operate analogously to programming interfaces, such as the now-deprecated Active Desktop from Microsoft. The Active Desktop API was provided to allow a web browser, displaying a page to be located behind the elements of the desktop GUI. In the active desktop model, the wallpaper essentially was not used (i.e., the reserved video memory was not used for displayed wallpaper), and instead, a fully instantiated browser window provided the background. Links present on the page displayed by the browser window could be selected. The browser window could not access local content, since so doing would violate the browser permission model. Essentially, the browser window would receive only the user inputs which the desktop shell would decide to pass on, and it would not have awareness of where such desktop GUI elements were located. A variety of other distinguishing aspects would be apparent to a person of ordinary skill, as between different implementations described herein.

In some embodiments, hardware associated with hardware level 102 includes a PC compatible computer, a Macintosh computer, a UNIX workstation, a smart device, a telephone, a personal digital assistant ("PDA"), a cellular phone, a smart appliance, an eBook reader, a server, and/or any computer or automated machine. In some embodiments the operating system 204 is a version of Microsoft Windows, Mac OS X, Linux, Android, BREW, Garnet OS, iPhone, or Symbian.

Unless described otherwise, an ordering of performance of elements of disclosed processes can be changed, such that the example processes are used in depicting and describing aspects of this disclosure, but otherwise do not imply limitations to the claims.

Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions. Similarly, a computer is used in a generic sense encompassing devices that can perform computational tasks, and which can take a wide variety of form factors, including smartphones, laptops, desktops, mobile information devices, e-books, desktops, tablets, and so on.

Computer program instructions can be stored on or in any tangible object that can be read or accessed by a device, examples of such including dynamic random access memories, static random access memories, magnetic storage media, optical storage media, flash media, phase change storage devices. Such computer readable media can be accessed over a network or other means for communicating information.

What is claimed is:

1. A system, comprising:
    a display;
    a processor;
    a memory subsystem;
    a computer readable medium storing
        a shell process for causing display of a Graphical User Interface (GUI) comprising a workarea with icons and a wallpaper image underlying the workarea, and to maintain information about locations of the icons on the workarea;
        a device driver for outputting events detected based on inputs received from an input device;
        an application for demarcating a sub portion of the workarea, and storing information about boundaries of the sub portion of the workarea;
        a message hook interposed in a communication path between the device driver and the shell process, operable to selectively redirect events from the device driver to the application, based on determining that an event occurred in a location of the work area within the sub portion of the workarea demarcated by the application, and which also is not in a location of any icon of the GUI; and
    wherein the icons and the wallpaper are maintained by the shell process and stored in a pre-allocated video memory portion of the memory sub-system.

2. The system of claim 1, wherein the computer readable medium further comprises computer executable instructions for a multitasking Operating System (OS), which supports windows for executing tasks, and the message hook further is operable to determine, as a further condition precedent to redirection of an event, that the shell process has focus to receive inputs from the input device.

3. The system of claim 1, wherein the message hook, responsive to receiving an event, polls the application for the boundaries of the demarcated subportion of the workarea.

4. The system of claim 1, wherein the message hook receives, from the application, the boundaries of the demarcated subportion of the workarea, responsive to updates by the application to the boundaries.

5. The system of claim 1, wherein the sub portion is one of a plurality of demarcated subportions of the workarea.

6. The system of claim 1, wherein the message hook executes in a memory space allocated to the shell process, and suppresses redirected events which otherwise would have reached the shell process through a messaging system provided by a multitasking Operating System.

7. The system of claim 1, wherein the computer readable medium further comprises computer executable instructions for a multitasking Operating System (OS), which supports windows for executing tasks, wherein an active task can have focus to receive inputs from the input device, and the message hook is operable to execute within a space in a memory allocated for that active task.

8. The system of claim 1, wherein the message hook executes in a memory space allocated to the shell process, and replicates messages consumed by the message hook but which should be received by the shell process, and outputs those messages for reception by the shell process.

9. The system of claim 1, wherein the message hook executes in a task which has current focus, among a plurality of memory-resident tasks using a multitasking Operating System (OS), and only if the task corresponds to the shell process does the message hook selectively redirect the event.

10. A method, comprising:
    receiving, in a computer system including a memory sub-system, an input device event associated with a location within a portion of a work area of Graphical User Interface (GUI) displayed on a display;
    determining that the location is outside of any displayed window of an application, is also outside of displayed work area icon elements of the GUI, and is within a portion of the work area associated with an application; and
    responsively processing the input device event as an event for the application associated with the portion of the work area;
    wherein the portion of the work area associated with the application is visually distinguished in a wallpaper background of the work area; and
    wherein the icon elements and wallpaper are maintained by a shell process and stored in a pre-allocated video memory portion of the memory sub-system.

11. The method of claim 10, wherein the application associated with the application event provides at least some functionality using the portion of the work area.

12. The method of claim 10, wherein the application provides additional functionality using a window activated during processing of the input device event.

13. The method of claim 10, wherein the wallpaper is updateable by the application.

14. The method of claim 10, wherein the application selects an image from an image library available at the computer system to be used in visually distinguishing the portion of the work area from the remainder of the wallpaper background.

15. The method of claim 10, wherein the determining and processing are performed by a messaging hook interposed between a device driver for an input device generating the input device event and a shell of an operating system maintaining the GUI.

16. The method of claim 10, wherein the portion of the work area associated with the application is visually distinguished in a wallpaper background of the work area stored in reserved video memory.

17. The method of claim 10, wherein the input device event is one or more of a left click, right click, and a hover event located according to a position of a cursor of the GUI, controlled by an input device.

18. The method of claim 10, wherein the portion of the work area is one of a plurality of work area portions associated with the application, and the determining is performed for the plurality of work area portions.

19. The method of claim 10, wherein if an output of the determining is that the location is within a displayed work area icon element of the GUI, then causing the input device event to be provided to a shell process maintaining the GUI.

20. The method of claim 10, wherein the determining that the location is outside of any displayed window of an application is performed based whether a shell process maintaining the GUI had input focus when the input device event was received.

21. The method of claim 10, wherein the receiving is performed by an extension to a shell of an operating system maintaining the GUI.

* * * * *